US006657556B2

United States Patent
Ogura et al.

(10) Patent No.: US 6,657,556 B2
(45) Date of Patent: Dec. 2, 2003

(54) VEHICLE MANAGING SYSTEM AND VEHICLE MANAGING METHOD

(75) Inventors: Koichi Ogura, Tokyo (JP); Toshiyasu Watanabe, Asaka (JP); Shunji Yano, Wako (JP); Naoki Terada, Tokorozawa (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 87 days.

(21) Appl. No.: 10/050,844

(22) Filed: Jan. 18, 2002

(65) Prior Publication Data

US 2002/0101363 A1 Aug. 1, 2002

(30) Foreign Application Priority Data

Jan. 31, 2001 (JP) ..................................... P2001-024934

(51) Int. Cl.[7] .................................................. G08G 1/14
(52) U.S. Cl. ............................ 340/932.2; 705/5; 705/6; 705/13
(58) Field of Search ........................... 340/932.2; 705/5, 705/6, 13, 9, 10

(56) References Cited

U.S. PATENT DOCUMENTS 5,812,070 A * 9/1998 Tagami et al. ........... 340/932.2

FOREIGN PATENT DOCUMENTS

| JP | 08-044801 | | 2/1996 |
| JP | 10-254978 | * | 9/1998 |
| JP | 2001-188999 | * | 7/2001 |
| JP | 2002-92105 | * | 3/2002 |
| JP | 2002-251581 | * | 9/2002 |

* cited by examiner

*Primary Examiner*—Nina Tong
(74) *Attorney, Agent, or Firm*—Arent Fox Kintner Plotkin & Kahn, PLLC

(57) ABSTRACT

A vehicle managing system including a vehicle to be lent to a user and a plurality of ports used for parking the vehicle. The plurality of ports include a first port which is located in the vicinity of a station of a transportation facility, and a second port which is located in the vicinity of both a residential area where a first user who uses the station resides and a place of destination for a second user who uses the station. In the vehicle managing system, the users are divided into a plurality of groups based on a direction of the vehicle between the first port and second port and a time zone using the vehicle, and the vehicles are alternately assigned to a group that moves to the station and another group that moves from the station based on the order of the time zone using the vehicle.

4 Claims, 13 Drawing Sheets

FIG. 5

| GROUP | DIRECTION OF VEHICLE | ASSIGNED TIME ZONES | | | | | | | |
|---|---|---|---|---|---|---|---|---|---|
| A-1 | PORT I → PORT II | 6:30 — 7:30 | | | | | | | |
| | PORT II → PORT I | | | | | 17:45 — 18:45 | | | |
| A-2 | PORT I → PORT II | | 8:00 — 9:00 | | | | | | |
| | PORT II → PORT I | | | 7:15 — 8:15 | | | | | |
| B-1 | PORT I → PORT II | | | | | | 17:00 — 18:00 | | |
| | PORT II → PORT I | | | | | | | 18:30 — 19:30 | |
| B-2 | PORT I → PORT II | | | | | | | | 19:45 — 20:15 |
| | PORT II → PORT I | | | | 8:45 — 9:45 | | | | |

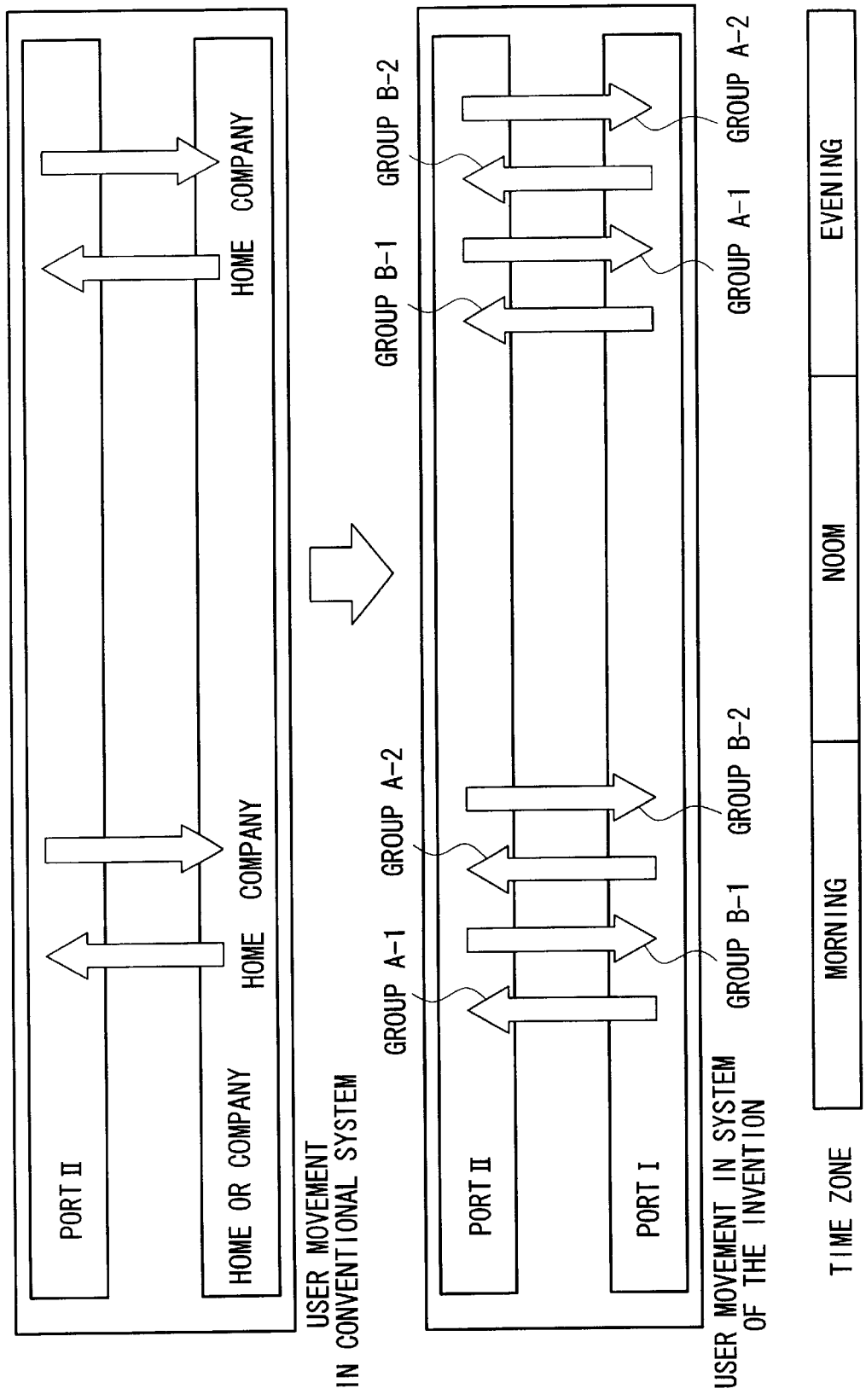

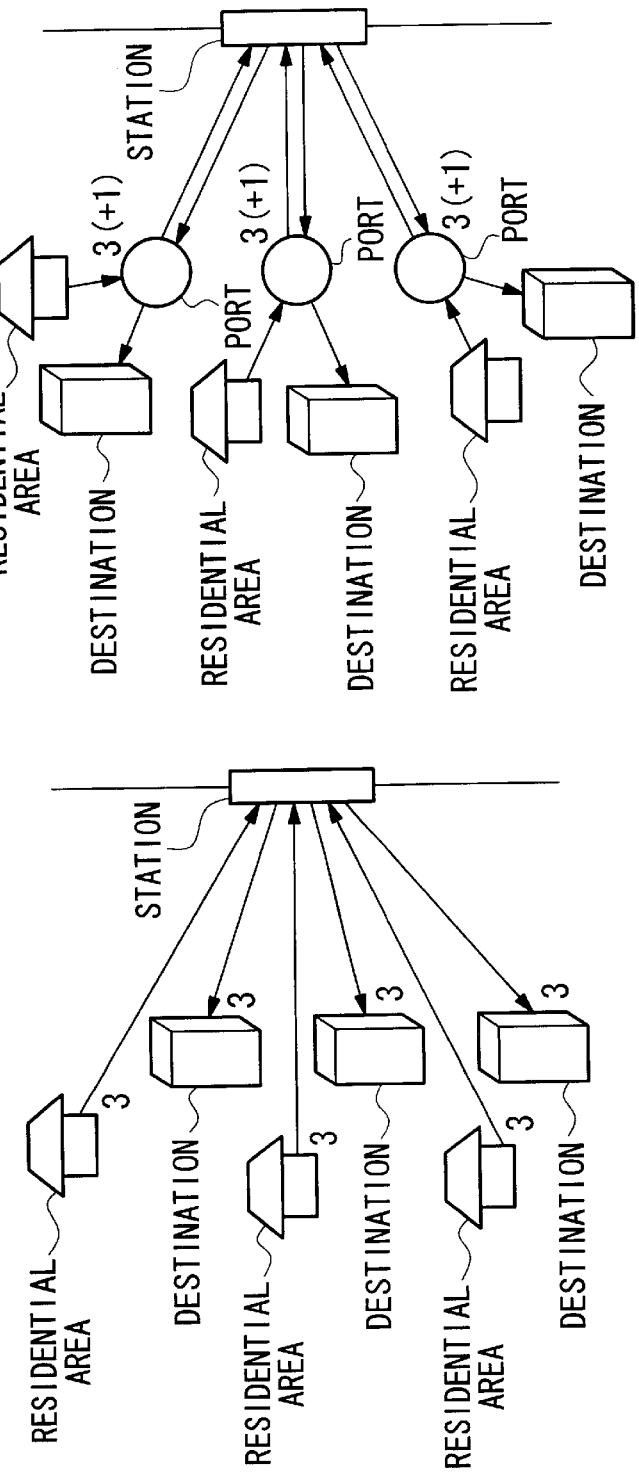

VEHICLE MANAGING SYSTEM
OF THE INVENTION

No. OF USER=3 PAIRS × (6+2 MEMBERS) =24

CONVENTIONAL SYSTEM

No. OF USER=3 PAIRS × (3+3 MEMBERS) =18

CONVENTIOAL SYSTEM

ONE VEHICLE CANNOT BE UTILIZED IF USER 1 TAKES A REST

VEHICLE MANAGING SYSTEM OF THE INVENTION

ALL VEHICLES CAN BE UTILIZED IF USER 1 TAKES A REST

VEHICLE MANAGING SYSTEM AND VEHICLE MANAGING METHOD

BACKGROUND OF THE INVENTION

1. Field of the Invention

The present invention relates to vehicle managing systems or vehicle rental systems, and to vehicle managing methods. More specifically, the present invention relates to a vehicle managing system or a vehicle rental system in which use of a vehicle is shared by a plurality of users and which is suitable for ensuring efficiency in the use of the vehicle by the users, and relates to a vehicle managing method used for the vehicle managing systems or the vehicle rental systems.

2. Description of Related Art

In Japanese Unexamined Patent Application, First Publication No. Hei 8-44801, a technique is disclosed which relates to a shared vehicle managing system in which a communication means is mounted on every one of a plurality of vehicles, which are parked in a parking space (called a port), and the vehicles are managed via a control center based on information which is sent via the communication means so that a plurality of users can share the use of the vehicles parked in the port. The shared vehicle managing system described in the above document employs a sharing style of vehicles called a "station car", and provides a managing service in which the port is located, for example, near a railway station and the users are divided into a plurality of groups, for example, a group that utilizes the shared vehicles when going to the station from home and parks the vehicle at the port to go to user's companies or schools using public transportation from the station, and a group that arrives at the station using public transportation and goes to user's companies or schools from the port using the shared vehicle. In the technique described in the above publication, in order to improve the efficiency of use of each of the vehicles, users are divided into groups based on time zone for utilizing a vehicle and are registered as members so that the number of vehicles and the area for the parking space may be reduced when the members use the vehicles based on the time zone.

However, in the above mentioned vehicle managing system which realizes a shared use of vehicles by the members, for example, once a group of the members that uses the vehicles to go to companies or schools from the station for the last time in the morning time zone drives the vehicles to private places, such as a company or school, the rest of the groups can no longer utilize the vehicles. Similarly, after a group of the members that uses the vehicles to go home from the station for the last time in the evening time zone drives the vehicles home, the rest of the groups can no longer utilize the vehicles. Accordingly, in the above mentioned technique, problems exist in that only two groups of the members can share the use of vehicles in practice.

Also, if one of the members that uses the vehicle to go to the station from home for the first time in the morning time zone takes a day off, the vehicles at his/her home cannot be utilized for the entire day.

Moreover, since it is inevitable that each group of members will drive the vehicles to private spaces, such as at a company, school or home, a parking space must be provided at these private spaces. Accordingly, although the number of vehicles may be reduced by sharing the vehicles, extra space is required for providing the parking space, which may be considered to be a wasteful use of land.

SUMMARY OF THE INVENTION

The present invention takes into consideration the above-mentioned circumstances, and has as an object providing a vehicle managing system in which more than two groups of users can share the use of vehicles so that the vehicles are used efficiently, and the space required for parking area is decreased in total.

In order to achieve the above object, a first aspect of the present invention provides a vehicle managing system including a vehicle to be lent to a user and a plurality of ports used for parking the vehicle, wherein the plurality of ports include a first port (for instance, a port II 45 in an embodiment described later) which is located in the vicinity of a station of a public or private transportation facility (for instance, a station 41 in an embodiment described later), and a second port (for instance, a port I 44 in an embodiment described later) which is located in the vicinity of both a residential area (for instance, a residential area 42 in an embodiment described later) where a first user who uses the station resides and a place of destination (for instance, a company 43 in an embodiment described later) for a second user who uses the station.

According to the vehicle managing system described above, it becomes possible to avoid an occurrence of the situation where a user who last uses the vehicle brings the vehicle to his/her private place, and other users can use the vehicle any time. Thus, the efficiency in utilizing the shared vehicles is improved by parking all of the shared vehicles at public places. Also, areas that would have required as parking spaces in private places become unnecessary, and hence, land in private places may be used efficiently. Moreover, since no parking area is required for the private places, it becomes possible to lend the vehicles to all drivers including one who does not have a parking space, and hence, income may be increased according to the present invention.

In a second aspect of the present invention, the above-mentioned vehicle managing system further includes a customer information storing unit (for instance, a customer controlling database 14 in an embodiment described later) in which a plurality of the first user and the second user, respectively, are divided into a plurality of groups and registered based on a direction of the vehicle between the first port and second port and a time zone using the vehicle, and a vehicle use controlling unit (for instance, step S11 through step S32 in an embodiment described later) which assigns the vehicle alternately to one of the plurality of groups that moves to the station and one of the plurality of groups that moves from the station, the plurality of groups being recorded in the customer information storing unit, based on the order of the time zone using the vehicle.

According to the vehicle managing system described above, it becomes possible to create a situation where a user drives a vehicle to a port for himself as well as for the next user so that the next user can utilize the vehicle from the port.

In a third aspect of the present invention, the above-mentioned vehicle managing system is characterized by the vehicle use controlling unit that assigns a third user to a time zone in which neither the first user nor the second user uses the vehicles so that the third user uses the vehicle from an arbitrary port where the vehicle is parked.

According to the vehicle managing system described above, it becomes possible to acquire a new user using the arbitrary port where the vehicles are gathered and to efficiently utilize the system.

Also, according to the second and the third aspect of the present invention, the efficiency in utilizing the shared vehicles may be improved without the necessity in moving the vehicles to required places by workers of the vehicle managing system side. Also, increase in income may be expected due to increase in the number of trips made by each of the vehicles between the ports and the number of users at particular time zones.

Moreover, according to the third aspect of the present invention, the shared vehicles may be efficiently utilized even when a user of the system takes a rest, and hence, increase in income can be expected.

The present invention also provides a method for managing a vehicle used in a vehicle managing system including a vehicle to be lent to a user and a plurality of ports used for parking the vehicle, wherein the plurality of ports include a first port which is located in the vicinity of a station of a public or private transportation facility, and a second port which is located in the vicinity of both a residential area where a first user who uses the station resides and a place of destination for a second user who uses the station, the method comprising the steps of: registering a plurality of the first user and the second user by dividing the plurality of the first user and the second user, respectively, into a plurality of groups based on a direction of the vehicle between the first port and second port and a time zone using the vehicle, and assigning the vehicle alternately to one of the plurality of groups that moves to the station and one of the plurality of groups that moves from the station based on the order of the time zone using the vehicle.

In yet another aspect of the present invention, the method for managing a vehicle described above further includes a step of assigning a third user to a time zone in which neither the first user nor the second user uses the vehicles so that the third user uses the vehicle from an arbitrary port where the vehicle is parked.

Next, effect of embodiments according to the present invention will be described in detail. According to the first aspect of the invention, for example, although a user moves between a port and a private space, such as at a home or a company, in a conventional system as shown in the upper half of FIG. 10, a user moves between the first port and the second port, etc. as shown in the lower half of FIG. 10 according to the vehicle managing system of an embodiment of the present invention. Accordingly, the vehicles are always available at the ports and the efficiency in sharing the use of the vehicles among the plurality of groups is increased.

Also, according to the embodiment of the present invention, all of the vehicles are parked at the ports, which are commonly used space, whereas the vehicles are parked at a private space, such as a company, school, or home of the users, in the conventional system. Accordingly, as shown in FIG. 11A, in a combination of three residential area and three places of destination, although the total number of parking spaces of 18 (i.e., 3 combinations×(3+3 vehicles)= 18), for instance, is required for the private area side in the conventional system, only the total number of 9 parking spaces (i.e., 3 combinations×(3 vehicles)=9) is required for the port I side according to the vehicle managing system of the present invention. Therefore, as shown in FIG. 11B, even if one extra vehicle is provided with each of the ports, only twelve vehicles are necessary according to the embodiment of the present invention.

According to the second and third aspects of the present invention, the vehicles are always parked at the commonly used space, not at the private space as in the conventional system. Accordingly, as shown in FIGS. 12A and 12B, in a combination of three residential area and three places of destination, although the number of users that may be registered as members is 18 (i.e., 3 combinations×(3+3 members)=18) in the conventional system, the number of the members may be increased to be 24 (i.e., 3 combinations× (6+2 members)=9) by increasing users at a particular time zone, etc., according to the vehicle managing system of the present invention.

According to the third aspect of the present invention, the vehicles are always parked at the commonly used space, not at the private space as in the conventional system. Accordingly, although a vehicle that cannot be utilized is generated in conventional systems when a user takes a rest as shown in FIG. 13A, users in the vicinity of an arbitrary port may efficiently use vehicles parked at the port according to the vehicle managing system of an embodiment of the present invention as shown in 13B.

BRIEF DESCRIPTION OF THE DRAWINGS

Some of the features and advantages of the invention having been described, others will become apparent from the detailed description which follows, and from the accompanying drawings, in which:

FIG. 5 is a table showing directions of the shared vehicles and assigned time zones for groups of users which are recorded in a customer controlling database of the reservation controlling center in the embodiment according to the present invention;

FIG. 10 is a diagram for comparing movements of users in a conventional system with that in the vehicle managing system according to an embodiment of the present invention;

FIGS. 11A and 11B are diagrams for comparing the number of parking spaces in a conventional system with that in the vehicle managing system according to an embodiment of the present invention;

DETAILED DESCRIPTION OF THE INVENTION

Hereinafter, embodiments of the present invention will be described with reference to the attached drawings.

Figure 1:
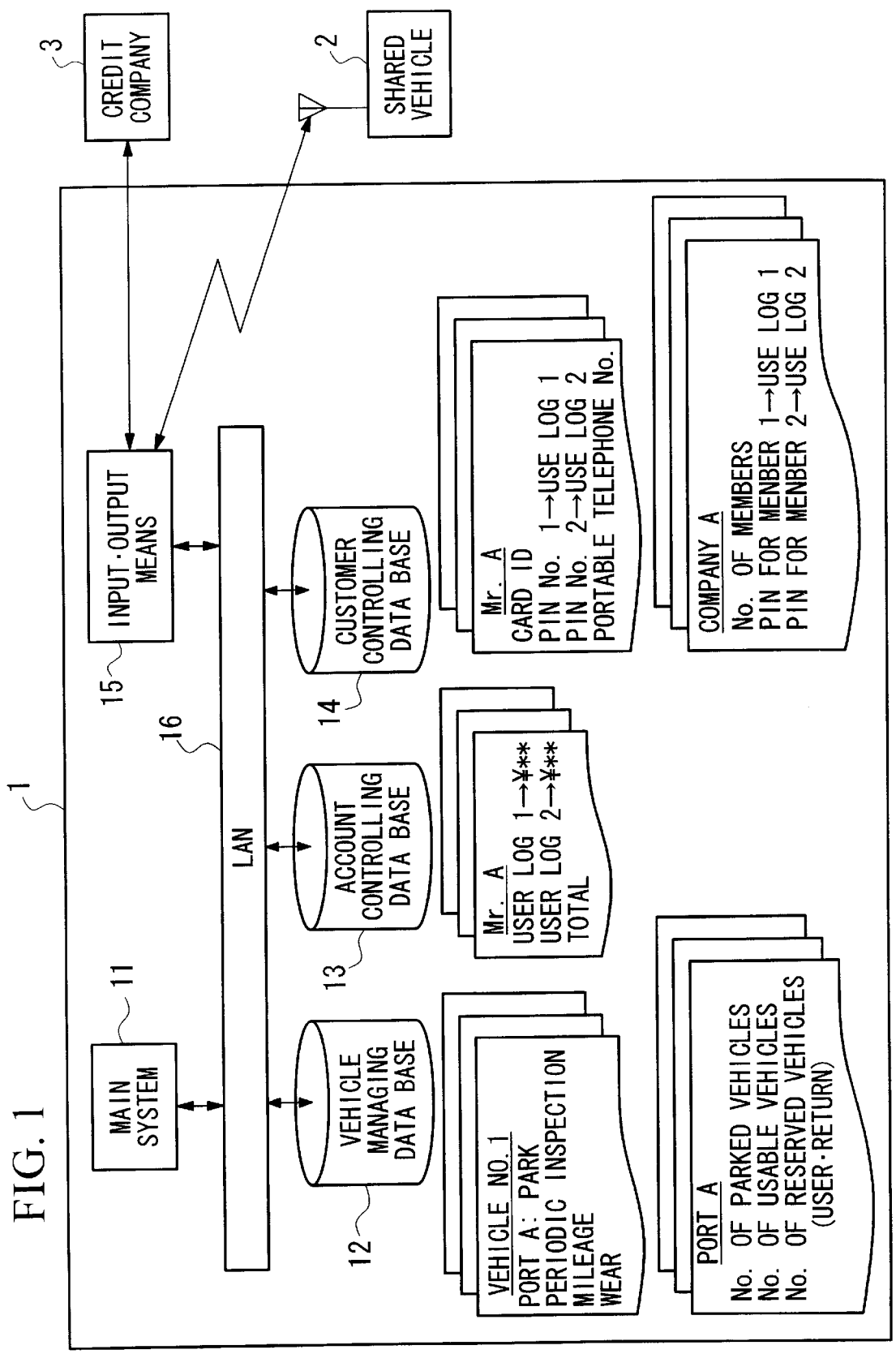
FIG. 1 is a schematic diagram showing a configuration of an embodiment according to the present invention.

FIG. 1 is a block diagram showing a configuration of an embodiment according to the present invention.

In FIG. 1, a reservation control center 1 is a center for controlling a shared use of vehicle 2 by users, and controls such items as a reservation, dispatch, and bill request relating to the vehicles 2. A credit company 3 is a financial institution through which the users settle the fee for using the vehicles. Note that one or more of the vehicles 2 are controlled under the reservation control center 1.

Also, the reservation control center 1 includes a main system 11, a vehicle managing database 12, an account controlling database 13, a customer controlling database 14, an input/output means 15, and a local area network (LAN) 16.

The main system 11 performs a reservation control center controlling program in a computer system provided with a central processing unit (CPU) in order to control the entire operation of the reservation control center 1. The operation of the main system 11 will be described in detail later.

The vehicle managing database 12 is a database in which states of each of the shared vehicles and ports are recorded in order to manage the shared vehicles 2. Items that may be recorded in the vehicle managing database 12 include, for example:

(1) location;
(2) time for periodic inspection;
(3) mileage, and
(4) degree of wear of each part, of each shared vehicle, and
(1) number of currently parked vehicles;
(2) number of currently usable vehicles, and
(3) number of reserved vehicles (use, return), at each port.

The account controlling database 13 is a database in which a bill for each user is recorded as a log file in order to settle the fee for each user via the credit company 3. In the account controlling database 13, for example, a plurality of log files in which a fee for using a vehicle is recorded for every use, and which are separated for each billing address, such as one account of a plurality of financial institutions, and a plurality of accounts of one financial institution, and a total of the fee are recorded.

The customer controlling database 14 is a database in which data of each user registered as a member is recorded. In the customer controlling database 14, for the cases where a member is an individual member, items may be recorded, such as:

(1) a card ID for authenticating a card;
(2) a plurality of personal identification numbers (PIN), such as PIN No. 1 and PIN No. 2, having different logs to which they are related, and
(3) a portable telephone number of the member.

Also, for the cases where a member is a corporate member, items may be recorded in the customer controlling database 14, such as:

(1) number of contracts with corporate members, and
(2) a plurality of PINs, such as PIN for corporate member No. 1 and PIN for corporate member No. 2, having different logs to which they are related.

The input/output means 15 is an interface unit used by the reservation controlling center 1 for sending and receiving log data to bill the credit card company 3 and the users. The input/output means 15 may also be used for sending and receiving vehicle managing data between the reservation controlling center 1 and the shared vehicles 2. Note that the vehicle managing data may be sent and received between the reservation controlling center 1 and the shared vehicles 2 by means of radiocommunication via a communication device (not shown in the figure) provided for each port.

The LAN 16 is a communication network which forms a local area network for sending and receiving data by connecting the above-mentioned main system 11, the vehicle managing database 12, the account controlling database 13, the customer controlling database 14, and the input/output means 15 in the reservation controlling center 1.

Next, the shared vehicle 2 used in an embodiment according to the present invention will be described in detail with reference to FIGS. 2 and 3.

Figure 2:
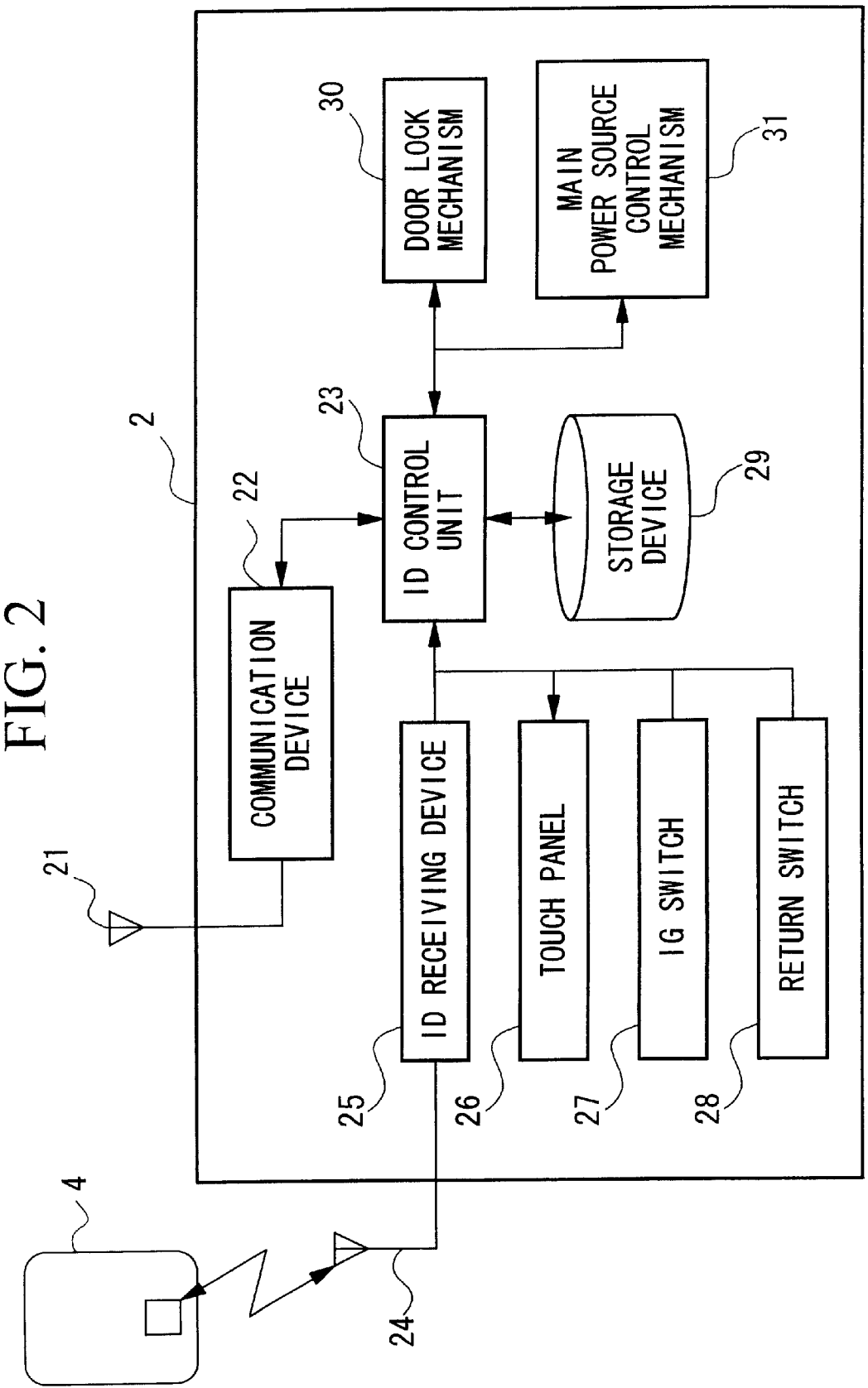
FIG. 2 is a schematic diagram showing a configuration of a shared vehicle used in the embodiment according to the present invention.

FIG. 2 is a block diagram showing a configuration of the shared vehicle 2. In FIG. 2, the shared vehicle 2 includes a communication antenna 21, a communication device 22, an ID control unit 23, a door antenna 24, an ID receiving device 25, a touch panel 26, an ignition (IG) switch 27, a return switch 28, a storage device 29, a door lock mechanism 30, and a main power source controlling mechanism 31.

The shared vehicle 2 is parked at a parking space called a port. Various kinds of data may be exchanged between the shared vehicle 2 and the reservation control center 1 by means of radiocommunication using a communication instrument (not shown in the figure) provided at each of the ports via the communication device 22 connected to the communication antenna 21 of the shared vehicle 2.

When a user holds a non-contact read and write type IC card 4 to the door antenna 24 provided with the shared vehicle 2, a signal read by the ID receiving device 25 is transmitted to the ID control unit 23 which controls the ID number of the shared vehicle 2. The ID control unit 23 communicates with the communication instrument (not shown in the figure) provided at each of the ports by means of radiocommunication via the communication device 22 connected to the communication antenna 21 in order to transmits the order from the user to use the shared vehicle 2 using the IC card 4 to the reservation control center 1 and asks for permission to use the vehicle 2.

Note that the above-mentioned IC card 4 is an example of an ID terminal which is capable of reading and writing recorded ID numbers, and according to this embodiment of the present invention, the ID terminal used for informing the ID number to the vehicle 2 is not limited, if the reading device of the vehicle 2 side can cope with the ID terminal, to the non-contact read and write type card and any form thereof is acceptable as long as it is capable of reading and writing a recorded ID number, such as, other than an IC card, a magnetic card and a portable telephone including an internal IC.

Also, when the user rents the vehicle 2, the user input required information to the ID control unit 23 via the touch panel 26, and starts using the vehicle 2 by pushing the ignition (IG) switch 27 to turn on the ignition of the vehicle 2. In addition, when the user returns the vehicle 2 to a particular port, the user is required to carry out a return process by pushing the return switch 28 at the port.

Further, an ID number assigned for every one of the shared vehicles 2 is prestored in the storage device 29. Also, an ID number or a PIN input by a user is temporarily stored in the storage device 29. The ID control unit 23 transmits the ID number of the vehicle 2 stored in the storage device, and the ID number or the PIN input by the user to the reservation control center 1, and when permission is given to the user to rent the vehicle 2, the door lock mechanism 30 unlocks the door key by the command from the reservation control center 1 to which permission for renting the vehicle was requested, and the main power source control mechanism 31 permits the use of the ignition circuit. An operation for the user to rent the shared vehicle 2 will be described in detail later.

Figure 3A:
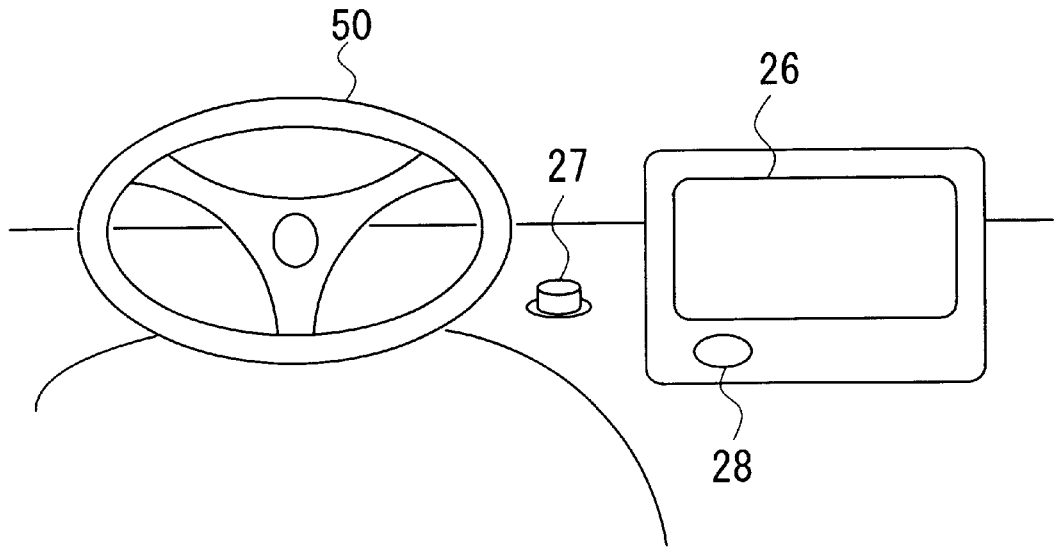
FIGS. 3A and 3B are diagrams showing an interior and an exterior, respectively, of the shared vehicle used in the embodiment of the present invention.
Figure 3B:
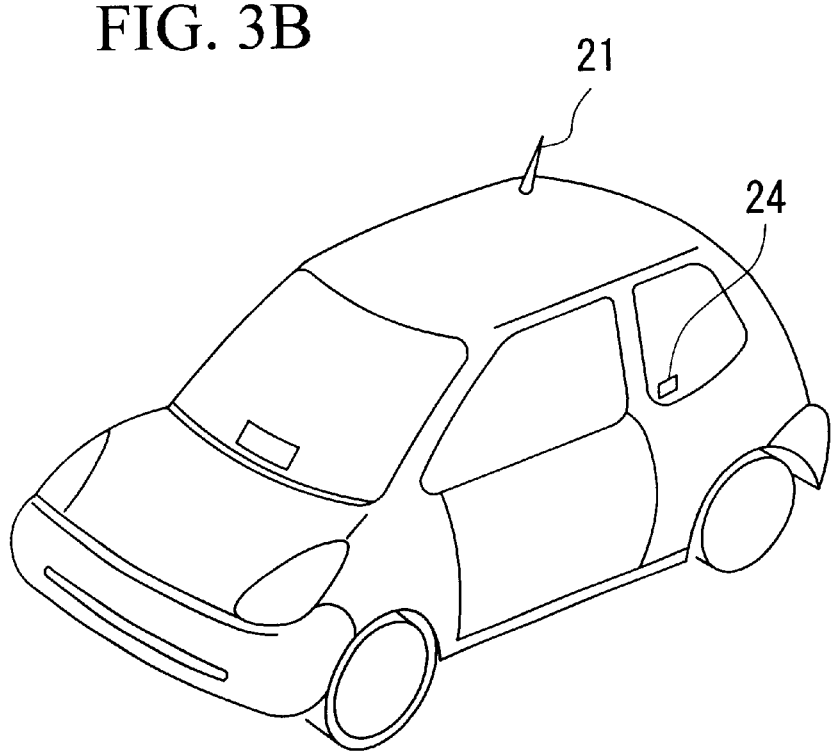

FIGS. 3A and 3B are diagrams showing an interior and an exterior of the shared vehicle 2, respectively. FIG. 3A shows an interior of the shared vehicle 2 in the vicinity of the driver's seat, and FIG. 3B shows the exterior of the vehicle 2 shown in FIG. 3A.

In FIG. 3A, the IG switch 27 is disposed in the vicinity of a steering wheel 50, and the touch panel 26 is disposed at a position where it does not interfere with the front view of the driver. Also, the return switch 28, which is used when the vehicle 2 is returned to a port, is disposed at the lower side of the touch panel 26.

In FIG. 3B, the communication antenna 21 is disposed on the roof of the shared vehicle 2 so that radio signals may be received from all directions, and the door antenna 24 is disposed on the door glass in the vicinity of the driver's sheet (i.e., the left side of the vehicle 2 in this case).

Next, an example of area where the vehicle managing system according to an embodiment of the present invention may be utilized will be explained with reference to FIG. 4.

Figure 4:
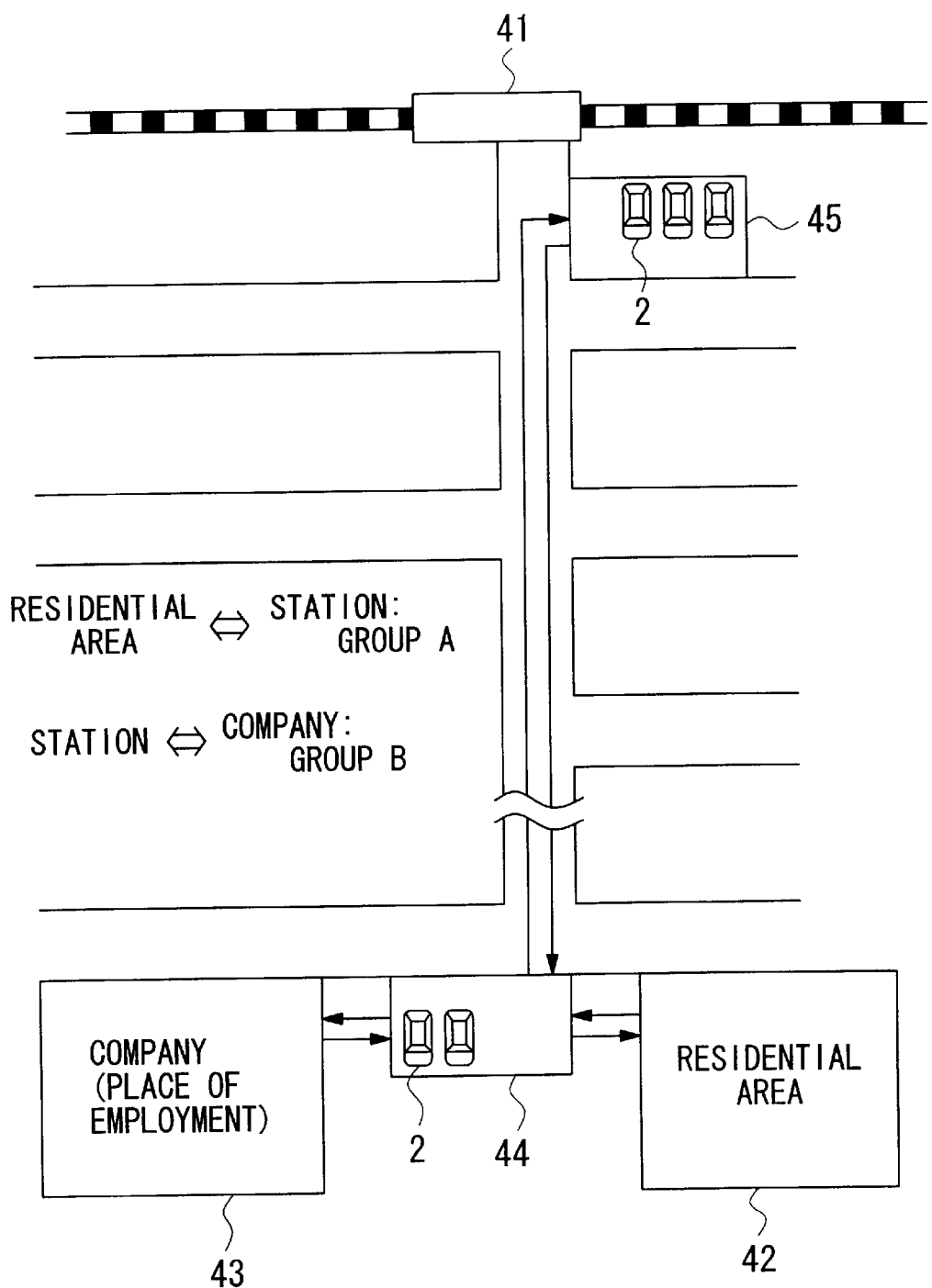
FIG. 4 is a diagram showing an area where the vehicle managing system according to the embodiment of the present invention may be utilized.

FIG. 4 is a diagram showing an area where the vehicle managing system according to an embodiment of the present invention may be utilized. In FIG. 4, a station 41, a residential area 42 located at a place some distance away from the station 41, a company located near the residential area 42, and a port I 44 and a port II 45 are shown. The station 41 may be any station for public or private transportation. In the residential area 42, some users of the system reside, and a company 43 is a place of employment for some other users of the system. The port I 44, which is used for parking the above-mentioned shared vehicles 2, is located in the vicinity of the residential area 42 and the company 43. Both the users reside at the residential area 42 and the users work at the company 43 may use shared vehicles 2 parked at the port I 44.

The port II 45 for parking the shared vehicles 2, on the other hand, is located in the vicinity of the station 41, and the users of the system who utilize the station 41 may use the shared vehicle 2 parked at the port II 45.

Next, a method for managing the shared vehicles 2 and the users of the vehicle managing system according to an embodiment of the present invention will be described explained.

The reservation controlling center 1, when the vehicles 2 are managed in the above-explained area, divides the users of the vehicle managing system into groups depending on a time zone in which each of the users uses the shared vehicles 2. The reservation controlling center 1 registers each of the users thus divided into the groups as a member of the system, and arranges the shared vehicles 2. For example, a group of users that uses the vehicle 2 for travelling between the residential area 42 and the station 41 may be categorized as a group A, and a group of users that uses the vehicle 2 for travelling between the station 41 and the company 43 may be categorized as a group B. Here, it is assumed that, in the morning, some of the users of the group A go somewhere, such as to a company or school, from the station 41 at a time earlier than the time at which some of the users of the group B arrive at the station 41, and that, in the evening, some of the users of the group B go somewhere, such as home, from the station 41 at a time earlier than the time at which some of the users of the group A return to the station 41.

When the users of the group A and the group B travel between the station 41 and the residential area 42 or the company 43 using the shared vehicles 2, the shared vehicles 2 go back and forth between the port I 44 and the port II 45. Accordingly, if the users of the group A and group B are further divided into groups depending on the time zone a user uses the shared vehicle 2 in order to more efficiently arrange and manage the vehicle 2, the vehicle 2 may be moved to a desired port in accordance with the destination of the users as shown in FIG. 5.

FIG. 5 is a table showing directions of the vehicles 2 and assigned time zones for the groups of users which are recorded in the customer controlling database 14. As shown in FIG. 5, the above-mentioned groups A and B of the users are further divided into groups A-1 and A-2 and B-1 and B-2, respectively, in accordance with the assigned time zone for particular users so that the use of the vehicles 2 may be efficiently shared.

The relationship between the users and the shared vehicles 2 will be explained in detail with reference to FIG. 5 as follows. The users who belong to the group A-1 drive to the port II 45 from the port I 44 using the vehicles 2 parked at the port I 44 in order to move from the residential area 42 to the station 41 at a time zone between 6:30 a.m. and 7:30 a.m.

Then, the users belong to the group B-1 drive to the port I 44 from the port II 45 using the vehicles 2 that were used by the users of the group A-1 in order to move from the station 41 to the company 43 at a time zone between 7:15 a.m. and 8:15 a.m.

Then, the users belonging to the group A-2 drive to the port II 45 from the port I 44 using the vehicles 2 that were used by the users of the group B-1 in order to move from the residential area 42 to the station 41 at a time zone between 8:00 a.m. and 9:00 a.m.

Then, the users belonging to the group B-2 drive to the port I 44 from the port II 45 using the vehicles 2 that were used by the users of the group A-2 in order to move from the station 41 to the company 43 at a time zone between 8:45 a.m. and 9:45 a.m.

Similarly, in the evening, the users belonging to the group B-1 drive to the port II 45 from the port I 44 using the vehicles 2 that were parked at port I 44 in order to move from the company 43 to the station 41 at a time zone between 17:00 p.m. and 18:00 p.m.

Then, the users belonging to the group A-1 drive to the port I 44 from the port II 45 using the vehicles 2 that were used by the users of the group B-1 in order to move from the station 41 to the residential area 42 at a time zone between 17:45 p.m. and 18:45 p.m.

Then, the users belonging to the group B-2 drive to the port II 45 from the port I 44 using the vehicles 2 that were used by the users of the group A-1 in order to move from the company 43 to the station 41 at a time zone between 18:30 p.m. and 19:30 p.m.

Then, the users belonging to the group A-2 drives to the port I 44 from the port II 45 using the vehicles 2 that were used by the users of the group B-2 in order to move from the station 41 to the residential area 42 at a time zone between 19:15 p.m. and 20:15 p.m.

In the above-mentioned manner, the shared vehicles 2 are finally gathered at the port I 44 so that the users belonging to the group A-1 can use the shared vehicles 2 the next morning.

Note that although the assigned time zones shown in FIG. 5 slightly overlap each other, this may be possible by managing the shared vehicles 2 so that the vehicles 2 are mainly assigned to a peak of each of the time zones in order to avoid a situation where no vehicles 2 are parked at the port I 44 and the port II 45. Also, although the users are divided into four groups (i.e., the groups A-1, A-2, B-1, and B-2) in the above-mentioned embodiment, the users may be divided into any number of groups and be registered as members in the customer controlling database 14 as long as the directions of the vehicles 2 and the time zones in which the vehicles 2 are used do not significantly overlap among the groups. In a case shown in FIG. 5, it may be convenient to assign a time zone between 9:45 a.m. and 17:00 p.m. or between 20:15 p.m. and 6:30 a.m., to users who are capable of returning the vehicle 2 to the port at which the user rented it in order to efficiently manage the vehicles 2.

Further, although only two ports (i.e., the ports I and II) are used for explaining the above-mentioned embodiment of the present invention, the number of the ports is not limited to two, and any numbers of the ports may be utilized as long as the shared vehicles 2 are managed so that the directions of the shared vehicles 2 and the assigned time zones are not significantly overlapped and the vehicles 2 are returned to a desired port.

Next, operation for lending a shared vehicle according to an embodiment of the vehicle managing system of the present invention will be described with reference to FIGS. 6 through 9.

Figure 6:
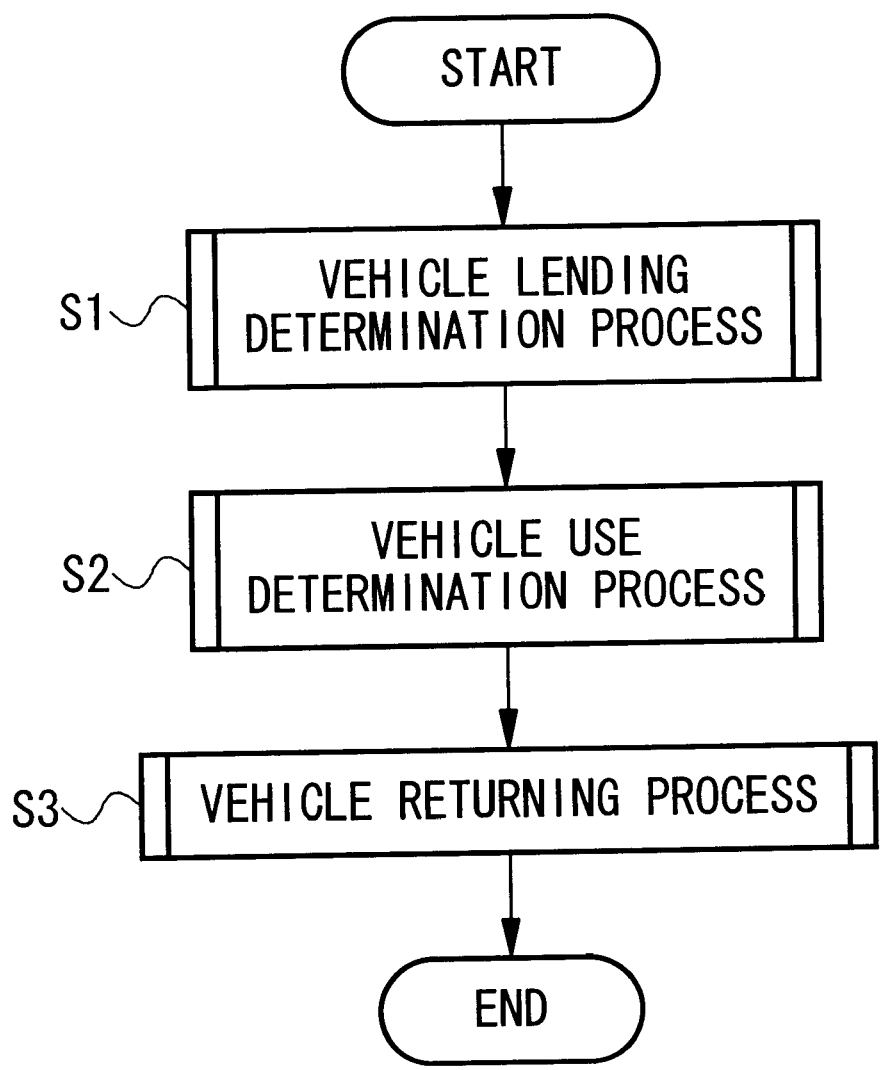
FIG. 6 is a flowchart showing the overall flow of a vehicle lending operation used in the vehicle managing system according to the embodiment of the present invention.

FIG. 6 is a flowchart showing the overall flow of the vehicle lending operation used in the vehicle managing system according to an embodiment of the present invention. As described above, when a user wishes to use a shared vehicle 2, the user goes to a port where a shared vehicle 2 is parked and holds a user IC card 4 to the shared vehicle 2 the user wishes to use in order to present the user card ID.

The shared vehicle 2 to which the user card ID is presented carries out a vehicle lending determination process by communicating with the reservation controlling center 1 and determines if the user can enter the inside of the vehicle 2 (step S1).

If the user is allowed to enter the vehicle 2, the user inputs a desired PIN if the user is an individual member, or an assigned PIN if the user is a company member, through the touch panel 26 so that the shared vehicle 2 may carry out a vehicle use determination process by communicating with the reservation controlling center 1 (step S2).

Finally, when the user, who has been allowed to use the shared vehicle 2 through the vehicle use determination process, has completed the use of the vehicle 2 and returns the vehicle 2, the user carries out a vehicle returning process to return the vehicle 2 to a port (step S3). In this manner, the operation for lending the shared vehicle 2 in the vehicle managing system according to the embodiment of the present invention is completed.

Note that when the user carries out the vehicle returning process, the fee is calculated and recorded in the user's log files stored in the account controlling database 13. Then, the fee is charged to an account assigned for each of the log files via the credit company 3.

Next, each step in the above-mentioned operation for lending a shared vehicle according to the embodiment of the vehicle managing system of the present invention will be described in detail with reference to FIGS. 7 through 9.

Figure 7:
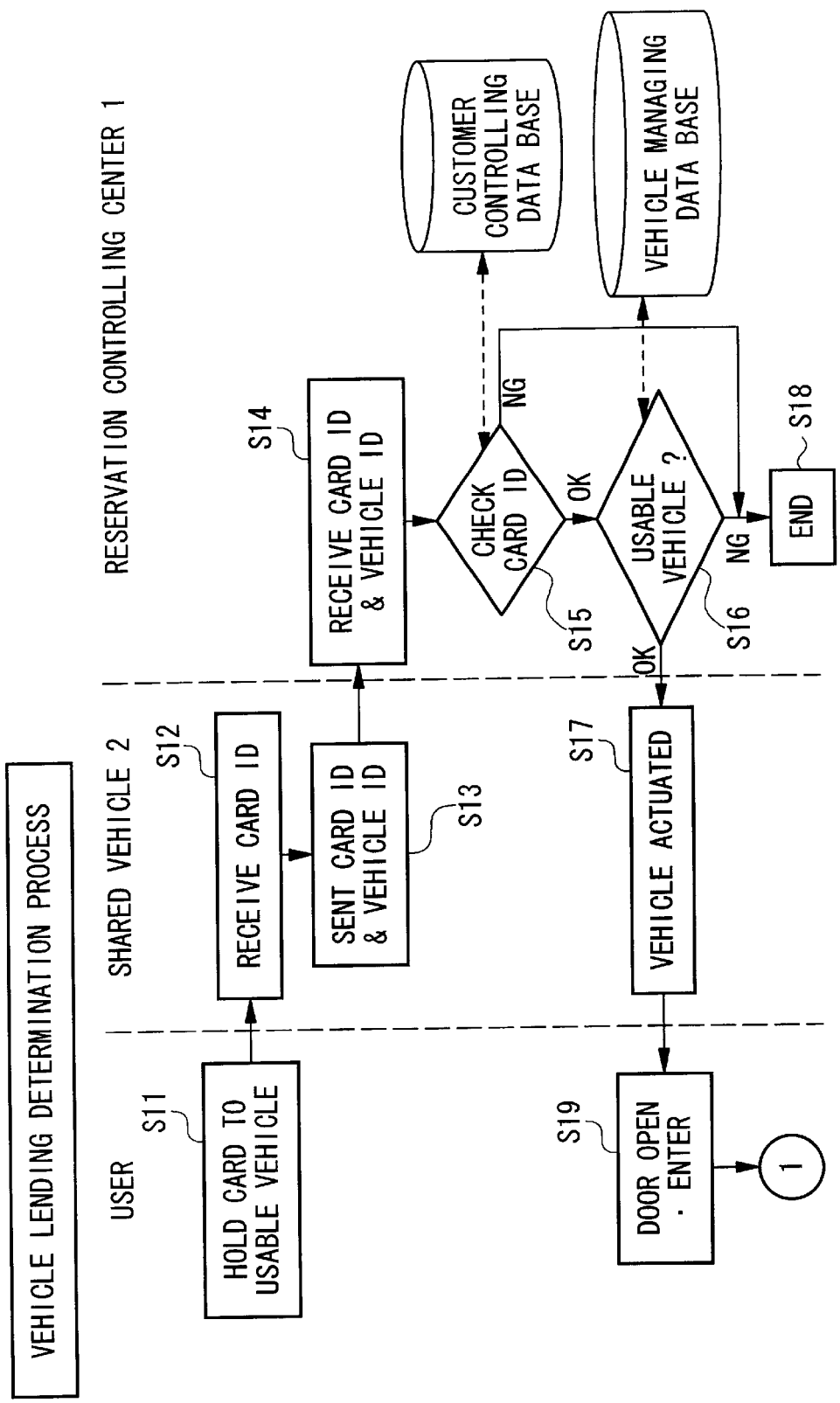
FIG. 7 is a diagram for showing the vehicle lending operation including operations by the user, between the shared vehicle and the reservation controlling center, and particularly explaining a vehicle lending determination process.

FIG. 7 is a diagram for explaining the vehicle lending operation including operations by the user carried out between the shared vehicle 2 and the reservation controlling center 1. In FIG. 7, the above-mentioned vehicle lending determination process is especially described in detail.

Figure 8:
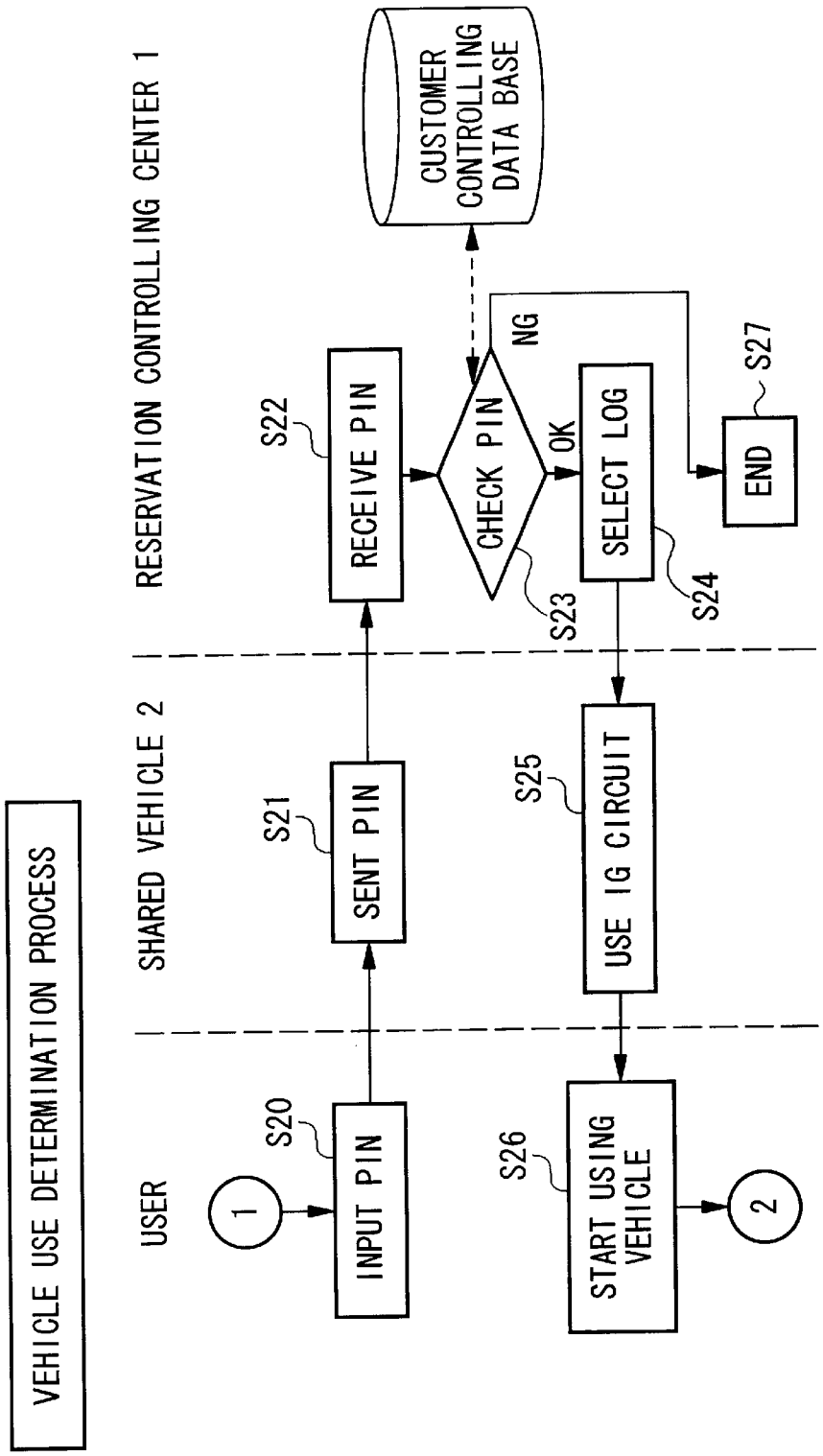
FIG. 8 is a diagram for showing the vehicle lending operation including operations by the user, between the shared vehicle and the reservation controlling center, and particularly explaining a vehicle use determination process.

FIG. 8 is also a diagram for explaining the vehicle lending operation including operations by the user carried out between the shared vehicle 2 and the reservation controlling center 1. In FIG. 8, the above-mentioned vehicle use determination process is especially described in detail.

Figure 9:
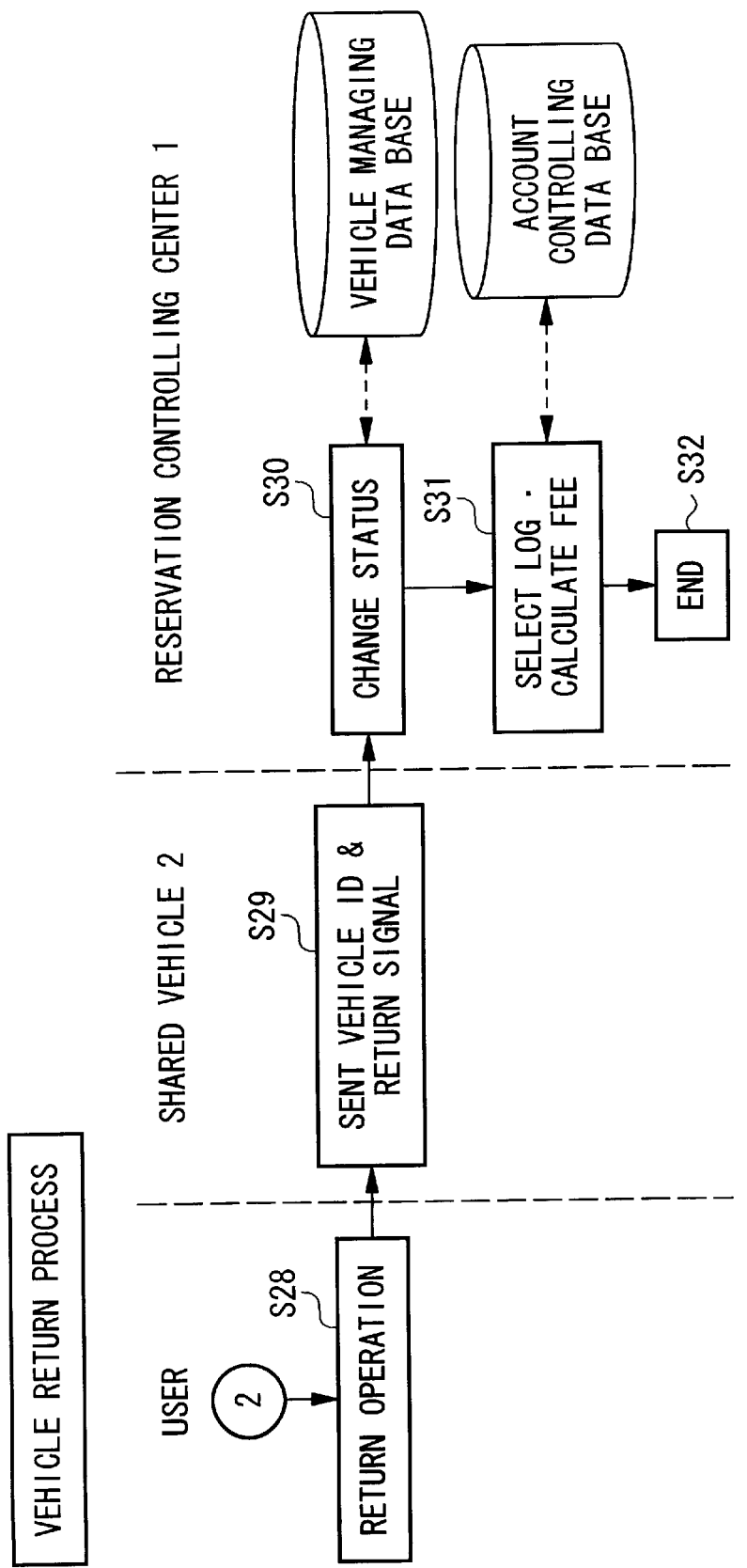
FIG. 9 is a diagram for showing the vehicle lending operation including operations by the user, between the shared vehicle and the reservation controlling center, and particularly explaining a vehicle returning process.
Figure 12B:
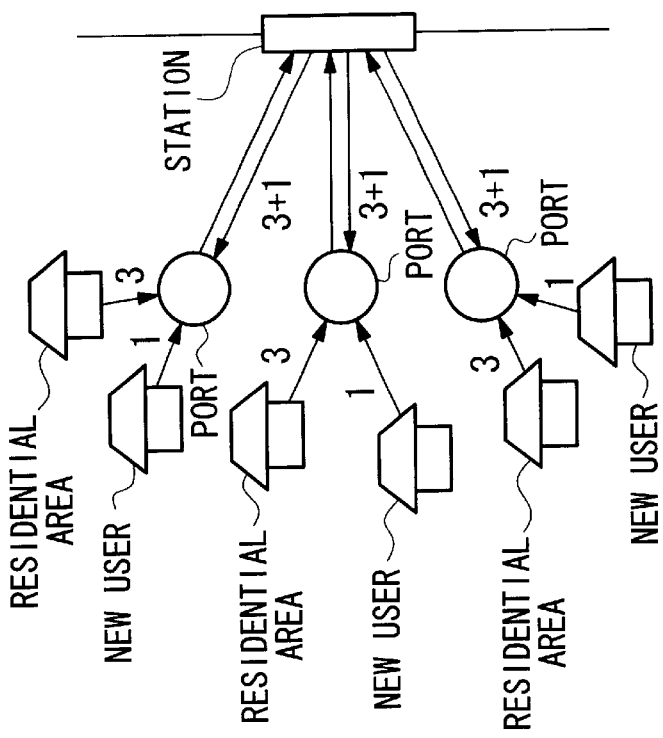
FIGS. 12A and 12B are diagrams for comparing the number of users in a conventional system with that in the vehicle managing system according to an embodiment of the present invention.
Figure 12A:
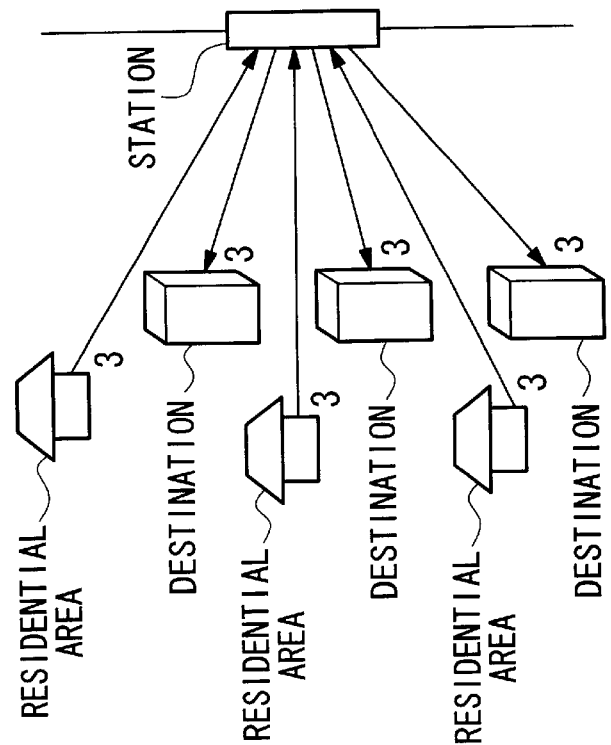
Figure 13A:
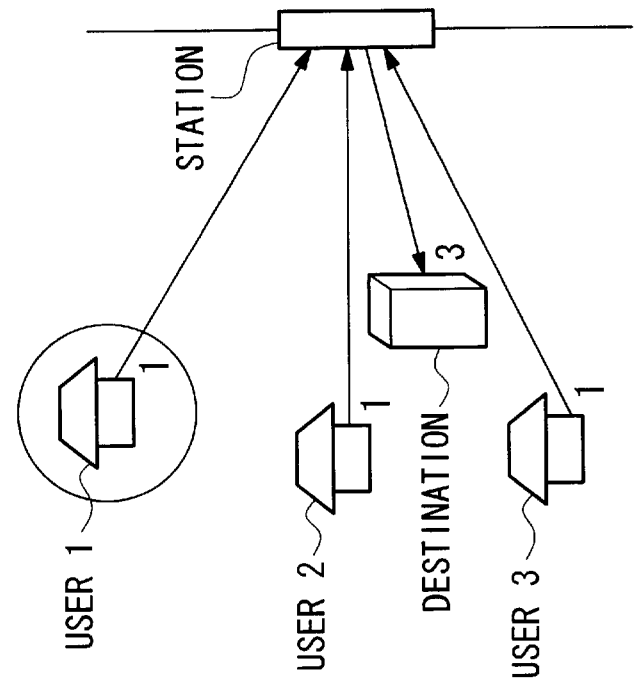
FIGS. 13A and 13B are diagrams for comparing the case in which a user takes a rest in a conventional system with that in the vehicle managing system according to an embodiment of the present invention.
Figure 13B:
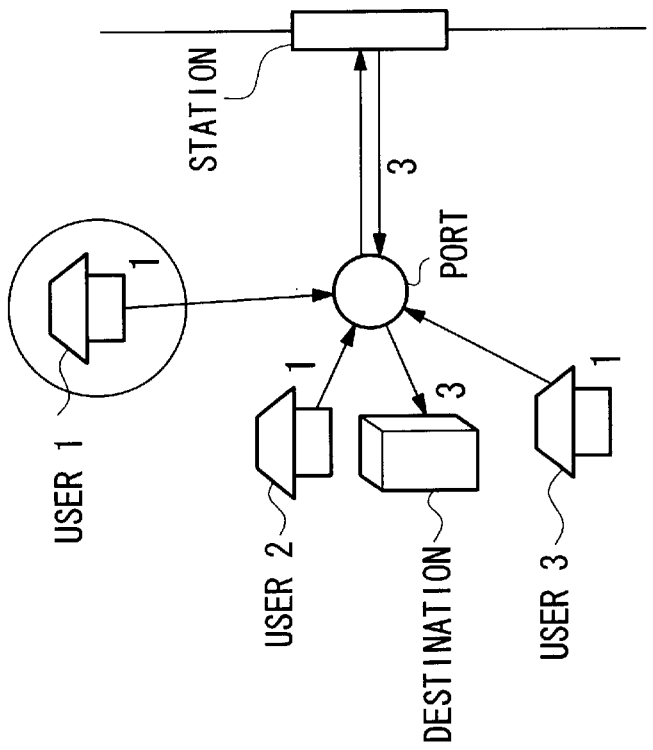

FIG. 9 is also a diagram for explaining the vehicle lending operation including operations by the user carried out between the shared vehicle 2 and the reservation controlling center 1. In FIG. 9, the above-mentioned vehicle returning process is especially described in detail.

When the user holds the user IC card 4 to the door antenna 24 of a usable shared vehicle 2 parked at a port (step S11), the shared vehicle 2 receives the card ID recorded in the IC card 4 via the ID receiving device 25 (step S12).

The received card ID is sent to the ID control unit 23 of the shared vehicle 2 and is transmitted to the reservation controlling center 1 together with the vehicle ID via the communication device 22 (step S13).

The card ID includes an ID which is common with the vehicle rental system to actuate the communication function between the shared vehicle 2 and the reservation controlling center 1.

The main system 11 of the reservation controlling center 1, which has received the card ID and the vehicle ID via the input/output means 15 (step S14), carries out a checking process for the card ID to determine if the user is entitled to use the shared vehicle 2 from the port at the particular time zone by referring to the customer controlling database 14 (step S15). If there is no problem in the checking process of the card ID (i.e., OK in step S15), it is determined whether the shared vehicle 2 having the received vehicle ID is in a usable state by referring to the vehicle managing database 12 (step S16).

If the shared vehicle 2 selected by the user is in a usable condition (i.e., OK in step S16), permission is given through the main system 11 of the reservation controlling center 1 to use the vehicle 2 and the lock of the vehicle 2 is unlocked by the door lock mechanism 30 which received the command from the reservation controlling center 1. At that time, a message is shown on the touch panel 26 to enter the user's PIN, and the shared vehicle 2 is actuated (step S17).

Note that if the checking process for the card ID fails (i.e., NG in step S15) or the shared vehicle 2 selected by the user is not in a usable state (i.e., NG in step S16), the vehicle lending determination process is terminated (step S18), and the user needs to reconfirm the card ID or carry out the vehicle lending determination process for another shared vehicle 2.

If the checking process is successful and the shared vehicle 2 is actuated, the user can open the door and enter the inside of the vehicle 2 (step S19).

When the user enters the shared vehicle 2, the user carries out an input operation of the user's PIN via the touch panel 26 (step S20). Here, as mentioned above, the user inputs a desired PIN if the user is an individual member, or an assigned PIN if the user is a company member.

The input PIN is transmitted to the reservation controlling center 1 via the communication device 22 by the ID controlling unit 23 of the shared vehicle 2 (step S21).

The main system 11 of the reservation controlling center 1 which received the PIN via the input/output means 15 (step S22) carries out a checking process for the PIN by referring to the customer controlling database 14 (step S23). If the result of the checking process for the PIN is good (i.e., OK in step S23), the main system 11 selects the log file which corresponds to the PIN (step S24).

After the log file is selected and the use of the shared vehicle 2 is allowed as a result of the PIN checking process, the main power source control mechanism 31, which received a command from the main system 11 of the reservation controlling center 1, permits the use of the ignition circuit of the shared vehicle 2 (step S25). Accordingly, the user can start the shared vehicle 2 by pushing the IG switch 27 to turn on the ignition (step S26).

If the checking process for the card PIN fails and the use of the shared vehicle 2 is not allowed (i.e., NG in step S23), the vehicle use determination process is terminated (step S27), and the user needs to reconfirm the PIN.

When the user has completed the use of the shared vehicle 2 and carries out a return operation by pushing the return switch 28 at a port (step S28), the ID controlling unit 23 of the shared vehicle 2 transmits the vehicle ID and a return signal to the reservation controlling center 1 via the communication device 22 (step S29).

The reservation controlling center 1, which received the vehicle ID and the return signal from the shared vehicle 2, carries out the returning operation. That is, the reservation controlling center 1 changes the status of the shared vehicle 2 which has the corresponding vehicle ID in the vehicle managing database 12 (step S30), and calculates the fee for the log file stored in the account controlling database 13, which is related to the PIN used, and records the charged fee (step S31). Then, the reservation controlling center 1 terminates the lending operation (step S32). The fee is charged to an account assigned for each of the log files via the credit company 3 based on the recorded log files.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the invention is limited and defined only by the following claims and equivalents thereto.

What is claimed is:

1. A vehicle managing system comprising:
    a vehicle to be lent to a user;
    a plurality of ports used for parking said vehicle including:
        a first port which is located in the vicinity of a station of a public or private transportation facility, and
        a second port which is located in the vicinity of both a residential area where a first user who uses said station resides and a place of destination for a second user who uses said station;
    a customer information storing unit in which a plurality of said first user and said second user, respectively, are divided into a plurality of groups and registered based on a direction of said vehicle between said first port and said second port and in a time zone using said vehicle, and
    a vehicle use controlling unit which assigns said vehicle alternately to one of said plurality of groups that moves to said station and one of said plurality of groups that moves from said station, said plurality of groups being recorded in said customer information storing unit, based on the order of the time zone using said vehicle.

2. A vehicle managing system according to claim 1, wherein
    said vehicle use controlling unit assigns a third user to a time zone in which neither said first user nor said second user uses said vehicles so that said third user uses said vehicle from an arbitrary port where said vehicle is parked.

3. A method for managing a vehicle used in a vehicle managing system including a vehicle to be lent to a user and a plurality of ports used for parking the vehicle, said plurality of ports including a first port which is located in the vicinity of a station of a public or private transportation facility, and a second port which is located in the vicinity of both a residential area where a first user who uses said station resides and a place of destination for a second user who uses said station, comprising the steps of:
    registering a plurality of said first user and said second user by dividing said plurality of said first user and said second user, respectively, into a plurality of groups based on a direction of said vehicle between said first port and said second port and a time zone using said vehicle, and
    assigning said vehicle alternately to one of said plurality of groups that moves to said station and one of said plurality of groups that moves from said station based on the order of the time zone using said vehicle.

4. A method for managing a vehicle according to claim 3, further comprising a step of:
    assigning a third user to a time zone in which neither said first user nor said second user uses said vehicles so that said third user uses said vehicle from an arbitrary port where said vehicle is parked.

* * * * *